Oct. 23, 1951  E. H. MUELLER  2,572,507
VALVE FOR CONTROLLING FUEL GAS
Filed Aug. 18, 1948
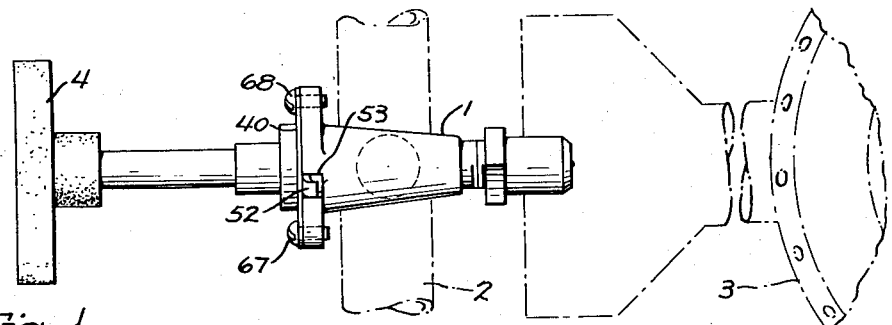
Fig. 1.
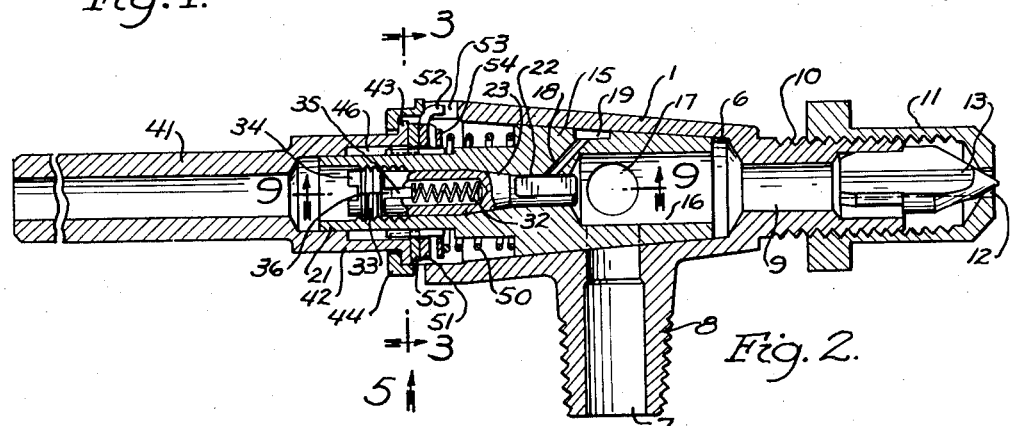
Fig. 2.
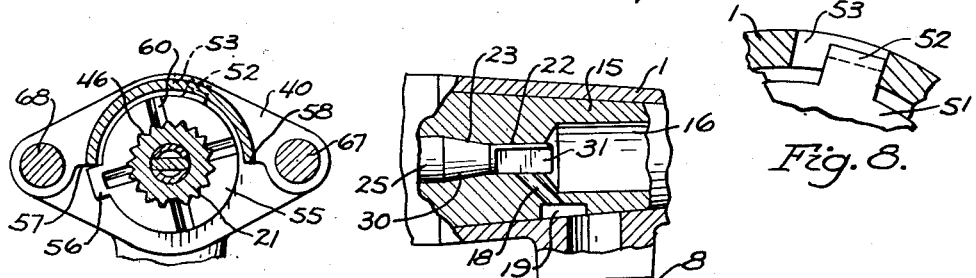
Fig. 3.   Fig. 4.   Fig. 8.
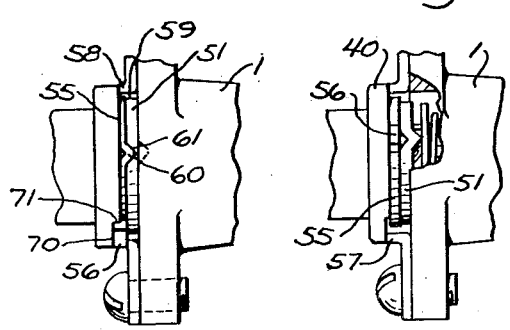
Fig. 5.   Fig. 6.
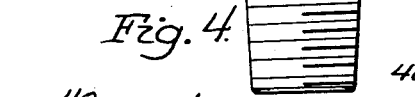
Fig. 7.
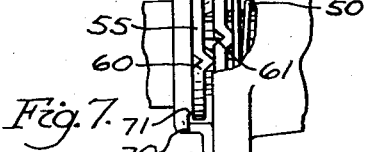
INVENTOR.
Ervin H. Mueller
BY
ATTORNEYS.

Patented Oct. 23, 1951

2,572,507

UNITED STATES PATENT OFFICE 2,572,507

VALVE FOR CONTROLLING FUEL GAS

Ervin H. Mueller, Grosse Pointe, Mich.

Application August 18, 1948, Serial No. 44,893

4 Claims. (Cl. 251—99)

This invention relates to a valve for controlling the flow of fuel gas to a burner.

The objects of the invention include the provision of a valve construction which has at least two positions of adjustment for the flow of gas therethrough and which has an operating handle capable of shifting relative to the controlled valve member so as to provide a locked or latched condition. A valve constructed in accordance with the invention may and preferably does have a locked or latched condition when the valve is off. The valve has a rotary operating stem and means, such as washers, associated therewith for providing a detent action in its intermediate position. This detent action is preferably accompanied by an audible clicking sound and the arrangement is such that the detent action and the audible sound occurs in the operation of the valve regardless of the shifted position of the handle. More specifically, the handle of the valve must be shifted axially so that it may be unlocked for the turning of the valve and the operator may either maintain pressure on the handle to hold it in shifted position or may release the handle from such pressure and the detent action and audible click occur in either instance.

A valve constructed in accordance with the invention is shown in the accompanying drawings:

Fig. 1 is a top plan view showing the valve and its operating stem and also indicating a gas supply pipe and burner.

Fig. 2 is an enlarged cross sectional view taken through the valve structure.

Fig. 3 is a sectional view taken substantially on line 3—3 of Fig. 2 showing structure of a controlling washer.

Fig. 4 is a sectional view showing the passageways when the valve is adjusted to simmer position.

Fig. 5 is a plan view of a portion of the valve looking at its underside in the direction of the arrow 5 of Fig. 2, showing some of the parts in off position.

Fig. 6 is a view similar to Fig. 5 showing the position of the parts in the full-on position of the valve.

Fig. 7 is a view similar to Figs. 5 and 6 showing parts as they appear when the valve is adjusted to simmer position.

Fig. 8 is an enlarged view illustrating the loose or floating key arrangement of one of the members.

In Fig. 1, the valve body is illustrated at 1 and the valve is for the purpose of controlling the flow of gas from a supply conduit 2 to a burner 3, the valve having an operating handle 4. The valve body, as shown in Fig. 2, has a valve chamber 6 therein with an inlet passage 7 formed in a screw threaded extension 8 which is arranged to be connected to the conduit 2 and an outlet passage 9 in a screw threaded extension 10. The outlet of the valve may be provided by the usual hood 11 with an outlet orifice 12 which is controlled by a pointed or needle-like member 13 fitted into the end of the extension 10.

The chamber 6 is tapered and a plug valve member 15 is seated therein. The valve member has an axial passage 16, a main inlet port 17 and a simmer port 18 with an enlarged opening at its end, as at 19. The valve member has a hollow stem portion 21 provided with internal threads, as shown, and a bore 22 which opens into the passage 16 while, between the hollow of the stem and the bore 22, is a tapered seat 23.

A throttling member with a body portion 25 is positioned in the hollow stem and it has a tapered part 30 seating on the tapered seat and an extension 31 which lies in the bore or passage 22. The extension 31 is flat on one side forming a D-shape in cross section. The passage 18 communicates with the bore 22 (Fig. 4) and the D-shaped extension 31 projects beyond the passage 18 and rotary adjustment thereof throttles the passage 18. The throttle member 25 has a recess therein and positioned in the recess is a spring 32. An operating member 33 has a head 34 slotted for the reception of a tool, such as a screw driver, and this member is mounted on the threads in the hollow stem. The member 33 has a key portion 35 which extends slidably into slot 36 in the throttle member 25.

It will be seen that by turning the member 33 the throttling member 25 is rotated to thereby adjust the D-shaped extension 31 and attain the desired throttling of the port 18. In this action, the member 33 advances and retracts on its screw threads but the throttling member 25 is maintained on its tapered seat by the spring 32 which reacts against the portion 35 of the member 33 to thus seal the hollow stem against leakage of gas.

A cap 40 is secured to the valve body and the hollow stem 21 projects therethrough. An operating stem 41 which is hollow, and which receives the handle 4, has an enlarged portion 42 which telescopingly fits over the stem 21 and which has a flange 43 which underlies the cap 40, the cap having a raised flange portion 44 for this purpose. The operating stem 41 and the stem portion 21 are slidably and non-rotatably connected together as by means of interfitting splines 46.

There are a pair of washers mounted inside the cap and normally held against the cap by a spring 50 which also acts to hold the valve member seated. One washer is illustrated at 51 and this washer is loosely and slidably keyed to the body, the washer having a key member 52 positioned in slot 53 in the body. This washer is mounted in a floating manner, the function of which will soon be described. An anti-friction washer 54 may be positioned between the washer 51 and the spring. A second washer 55 is positioned next adjacent the end of the hollow stem 41 so as to abut the same under the action of the spring 50. The washer 55 has a projecting lug 56 and the underside of the flange of the cap is cut away for a portion of its extent to provide a way or clearance 59 terminating in abutments 57 and 58 against which the projection 56 abuts to limit the rotation of the valve member. The projection 56 operates in the clearance space between the abutments 57 and 58. This washer 55 is slidably and non-rotatably mounted on the stem portion 21, as by means of the cooperating splines 46. The washer 55 is formed with projections 60 which may be formed by pressed-out portions as shown in Figs. 3 and 7, these projections conveniently being four in number, and the washer 51 is provided with a similar cooperating formation providing recesses 61 arranged to receive the projections 60.

The flange of the cap is further cut away to form a recess 70 defined by a shoulder 71 for receiving the projection 56 when it is against or substantially against the shoulder 57. The cap 40 may be secured to the body by screws 67 and 68 and the arrangement is preferably such that the cap can only be secured to the body in one position.

In the normal off position, this being the position shown in Fig. 2, the port 17 and the inlet end 19 of the port 18 are disaligned from the inlet 7. In this position the spring 50 holds the washers together and against the flange 43 of the stem 41, and the flange 43 abuts the flange 44 of the cap as shown in Fig. 2. In this position, the projection 56 is substantially against the abutment 57 (Fig. 3) and the projection 56 lies in the recess 70 (Fig. 5). The handle and valve member cannot be turned as the finger 56 lies between the abutment 57 and the abutment 71 although there may be some looseness so that a very slight turning action is permitted but not enough to operate the valve. In this position, the two washers 51 and 55 may be so relatively positioned that the projections 60 on the one washer register with and lie in the recesses 61 of the other washer.

To turn the valve the stem 41 must be pushed inwardly thus compressing the spring 50 and urging both washers to the right as Fig. 2 is viewed. This positions the finger 56 in alignment with the clearance 59 and the valve may now be turned. This may be in a counter-clockwise direction as Fig. 3 is viewed. If the projections and recess formation 60 and 61 are registered in the beginning of the turning action, they become out of registry as the washer 55 turns with the valve stem. This is permitted as the washer 51 may be pushed axially against the action of the spring 50 (see Fig. 7). The projections 60 thus ride over the face of the washer 51. When the main inlet port 17 is aligned with the inlet passage 7, the projections 60 snap into the recesses 61. The arrangement may be such that the valve is turned about 90° from off position to the full on position with port 17 in registry with the inlet 7. A distinct click or snap is afforded because the washer 51 has some relative rotary movement since the key 52 is relatively loosely positioned in the slot 53. Accordingly, a distinct audible sound is given to indicate the intermediate position of the valve member which is the full on position. This position of the parts is indicated in Fig. 6. The key 52 of the washer 51, as shown in Fig. 8, is so loosely mounted in the keyway 53 that the finger or key 52 shifts back and forth and slaps the sides of the keyway. In other words, when the inclined faces of the projection 60 function on the inclined faces of the recesses 61, the washer 51 is quickly rocked and the key 52 will shift from one side of the keyway to the other, and thus strike the opposite side and provide a distinct click.

Further rotary movement of the valve causes the projections 60 to ride out of the recesses 61 and when the finger 56 strikes the shoulder 58 the valve is in simmer position (Fig. 7). In this position the ports are located as shown in Fig. 4, and a small supply of gas may pass through port 18. This supply of gas may be metered by the rotary adjustment of the throttle member, as will be appreciated by reference to Fig. 8.

It will be observed that the audible indication occurs regardless of whether or not the operator maintains an inward axial pressure on the handle. The operator must shift the handle and stem inwardly toward the valve to move the finger 56 out of its locking recess. This action moves both of the click washers inwardly. If the operator releases the axial pressure the click action occurs as the projections 60 snap into the recesses 61. If the operator continues the axial displacement of the washers, the clicking action occurs and may be even louder because of slightly greater compression of the spring 50. When the parts are in simmer position, as shown in Fig. 7, and in Fig. 8, the interengaging projections and recesses 60 and 61 may or may not be in engagement as desired. As shown in Fig. 7 they are not in engagement.

As the valve is turned clockwise, with the finger 56 moving away from the abutment 58 the washers again click together at the intermediate or full on position. In this action the key shifts in the keyway or slot 53 in the opposite direction than the one previously described. As the valve is turned off by continued clockwise movement, the finger 56 finally meets the abutment 57 and snaps into the recess 70 and the valve is again locked in off position.

I claim:

1. A valve for controlling the flow of gas to a gas burner comprising, a body having a chamber therein with inlet and outlet passages, a valve member rotatably seated in the chamber and having ports arranged to register with one of the passages in two different rotary positions of the valve member, a cap for the body, a stem portion on the valve member, an operating stem slidably keyed to said stem portion and having a flange inside the cap, a pair of members surrounding the stem inside the cap, a spring reacting against the valve member for holding the members against each other with one of the members held against the said flange and the flange held abutted against the cap, one of said members being keyed to the stem portion for axial sliding movement, the other member being loosely keyed to and axially shiftable relative to the body, a finger projecting from said one member, a recess having a shoulder in the cap in which the said finger is held by the spring to lock the valve member against turning movement, interengaging projections and recesses on said members adapted to audibly click into registry with each other when the valve member is turned by the operating stem to indicate a position when a port is in registry with a passage, said finger being releasable from the said recess by axial shift of the operating stem and both of said members thereby flexing the spring, whereby the audible click is increased when the stem is held in said shifted position, and abutments engageable by the projecting finger to limit the rotary movements of the valve member.

2. A valve for controlling the flow of gas to a gas burner comprising, a body having a chamber therein with inlet and outlet passages, a valve member rotatably seated in the chamber and having ports arranged to register with one of the passages in two different rotary positions of the valve member, a cap for the body, a stem portion on the valve member, an operating stem slidably keyed to said stem portion and having a flange inside the cap, a pair of members surrounding the stem inside the cap, a single spring for holding the members against each other with one of the members held against the said flange and the flange held abutted against the cap, said spring reacting on the valve member to hold it seated in the chamber, one of said members being keyed to and axially slidable on the stem portion, the other member being loosely keyed to and axially shiftable relative to the body, a finger projecting from said one member, a recess having a shoulder in the cap in which the said finger is held by the spring to lock the valve member against turning movement, interengaging projections and recesses on said members adapted to audibly click into registry with each other when the valve member is turned by the operating stem to indicate a position when a port is in registry with a passage, said finger being releasable from the said recess by axial shift of the operating stem and both of said members thereby flexing the spring, whereby the audible click is increased when the stem is held in said shifted position, and abutments engageable by the projecting finger to limit the rotary movements of the valve member.

3. A valve for controlling the flow of gas to a gas burner comprising, a body having a chamber therein with inlet and outlet passages, a valve member rotatably seated in the chamber and having ports arranged to register with one of the passages in two different rotary positions of the valve member, a cap for the body, a stem portion on the valve member, an operating stem slidably keyed to said stem portion and having a flange inside the cap, a pair of washer members inside the cap and surrounding the said stem portion, a spring between the washer members and the valve members for holding the valve member seated in the chamber and for compacting the washers against the said flange abutted with the flange against the inside of the cap, one washer being keyed to and axially slidable on the stem portion, the other washer being loosely keyed to and axially shiftable relative to the body, a projecting finger on said one washer, a shouldered recess in the cap into which the finger is urged by the spring whereby to lock the valve against rotary movement, said washers both being shiftable by axial movement of the operating stem against the action of the spring to disengage the projecting finger from the recess, said washer members having cooperating projections and recesses adapted to audibly click into registry with each other under the action of said spring when a port in the valve member is in registry with a passage, the audible click being increased when the stem and washers are held in axially shifted position, and abutments engageable by the projecting finger to limit the rotary movement of the valve member.

4. In a valve for controlling gaseous fuel having a body member and a valve member turnable therein, the members having ports for registering in an intermediate position of the valve member, an operating stem slidably keyed to the valve member, a pair of washers substantially concentric with the valve member, one of which is keyed to the valve member and the other of which is loosely keyed to the body member and both of which are axially shiftable relative to the valve member, a single spring for keeping the washers compacted against each other and against the operating stem and acting upon the valve member to seat it in the body member, locking means for holding the valve member against rotation, said washers having cooperating projections and recesses adapted to audibly click into engagement when the valve member is in said intermediate position, the locking means being releasable by axial shift of the operating stem and the washers relative to the valve member against the action of the spring means, and the projections and recesses of the washers adapted to audibly click into engagement when the operating stem and washers are in axially shifted position and in non-shifted position, with the audibility of the click increased when the operating stem and washers are in axially shifted position, and means for limiting the rotary movement of the valve member.

ERVIN H. MUELLER.

REFERENCES CITED

The following references are of record in the file of this patent:

UNITED STATES PATENTS

| Number | Name | Date |
|---|---|---|
| 1,917,983 | Kindl | July 11, 1933 |
| 1,933,177 | Kindl | Oct. 31, 1933 |
| 2,142,368 | Mueller | Jan. 3, 1939 |
| 2,262,703 | Stuckenholt | Nov. 11, 1941 |
| 2,334,346 | Mueller | Nov. 16, 1943 |